Oct. 28, 1969  K. DAMM ET AL  3,474,494
GRAMOPHONE RECORD PRESSES
Filed July 20, 1965
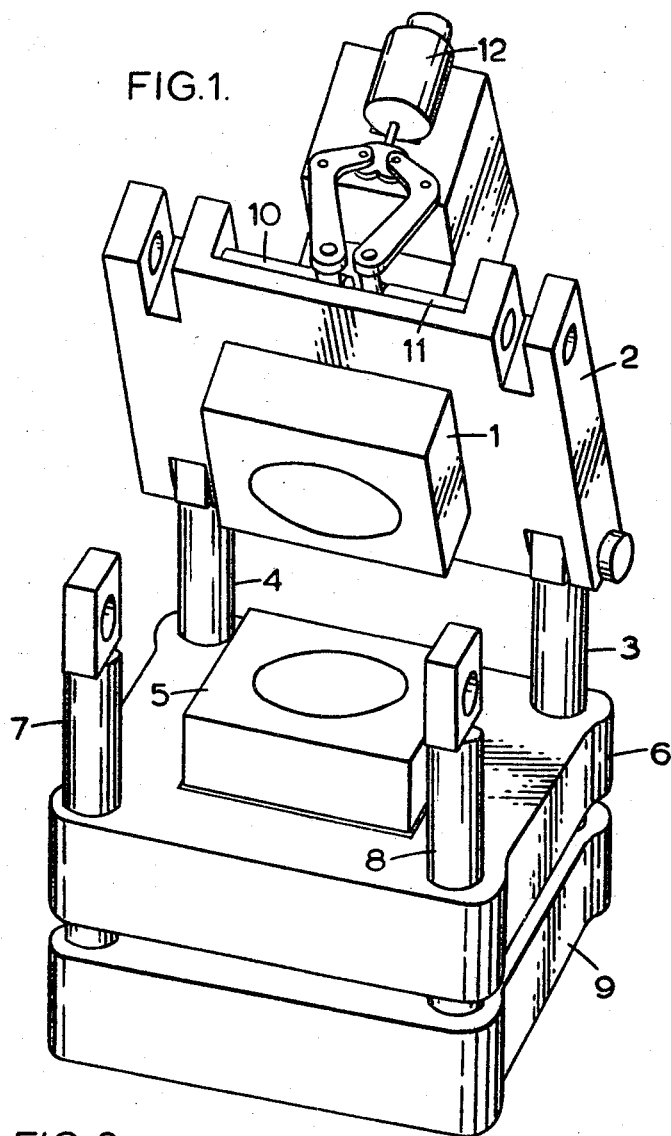
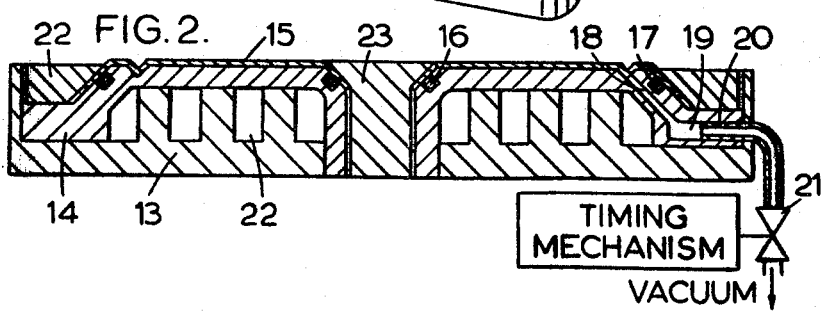

United States Patent Office 3,474,494
Patented Oct. 28, 1969

3,474,494
GRAMOPHONE RECORD PRESSES
Kurt Damm, Hermuelheim, and Hermann Strausfeld, Cologne-Ehrenfeld, Germany, assignors to Carl Lindstrom Gesellschaft m.b.H., Cologne-Braunsfeld, Germany, a company of Germany
Filed July 20, 1965, Ser. No. 473,323
Claims priority, application Germany, Aug. 1, 1964, L 48,441
Int. Cl. B29d 17/00
U.S. Cl. 18—5.3       5 Claims

ABSTRACT OF THE DISCLOSURE

In gramophone record moulding press, means are usually provided for securing the record pressing matrix to the front surface of the face plate at both moulds of the press. In accordance with the invention the matrix is reliably held in contact with the face plate during the record moulding operations by providing sealing means to form a substantially air tight seal between the matrix and the face plate adjacent the edges of the matrix, and at least one air channel leading from a point on said front surface covered by the matrix and connected to a vacuum pump.

---

This invention relates to gramophone record moulding apparatus and, especially to the securing of matrices in gramophone record presses.

Gramophone records are normally manufactured by pressing a suitable quantity of thermo-plastic material between two mould formers each made up of a matrix derived from a master recording. Each stamping matrix may typically be formed of nickel of from about 0.2 to 0.3 mm. in thickness and this is fixed to the face plate of a record press by a peripheral clamping ring and a central clamping plate. This method of attachment tends to allow air to be trapped between the matrix and the face plate. During the stamping process heat is applied to the face plate to render the molding material plastic. The trapped air is also heated and expands causing the matrix to lift. This introduce a risk that the mating matrices may contact each other during the pressing process, causing damage to the recorded grooves, particularly near the periphery of the matrix.

It has been proposed to remove this disadvantage by increasing the size of the clamping ring so that it holds the matrix down without clamping it tightly, in such a way that the matrix may push itself under the clamp ring at the edges to which the trapped air migrates. It was found however that undesired foreign bodies were thereby able to gain entrance to the space between the matrix and the face plate during the operation of the record press, causing small defects to form on the matrices which are then transferred to the records.

It is an object of the invention substantially to overcome the above mentioned disadvantages and thereby to provide an improved form of record press.

Another object of the present invention is to provide an improved gramophone record moulding press including means for reliably holding down the record pressing matrix on each face plate so that the matrix is held in contact with the whole of the face plate and the entry of foreign bodies into the space between the matrix and its face plate is restricted.

According to the present invention there is provided a gramophone record moulding press including a face plate, the front surface of which is so formed that a record pressing matrix can be mounted thereon in a determined position, and means for securing the matrix to said front surface, and wherein the improvement consists in the provision of sealing means to form a substantially air tight seal between the matrix and said front surface adjacent the edges of the matrix when the matrix is secured thereon, and at least one air channel leading from a point on said front surface covered by the matrix when said matrix is mounted thereon whereby air can be removed from the space between said front surface and a record pressing matrix mounted thereon.

In order that the invention may be clearly understood and readily carried into effect an embodiment of the invention will now be described by way of example with reference to the accompanying drawings of which:

FIGURE 1 is a perspective view of an embodiment of a record press embodying the invention, and FIGURE 2 is a sectional view of the lower mould of the press shown in FIGURE 1, showing a matrix in position.

The present invention may be applied to any convenient record press. A typical form of record press is shown in FIGURE 1. An upper mould 1 is mounted on a plate 2 hinged to supporting pillars 3 and 4. A lower mould 5 is mounted on a plate 6 which is a sliding fit on the columns 3, 4, 7 and 8, which latter are fixed to the base plate 9 of the press. The plate 2 may be closed down so that the two moulds 1 and 5 face each other and it may be fixed in this position by bolts 10 and 11 which are driven by the hydraulic motor 12 into the apertures at the top of columns 7 and 8.

Prior to closing the mould appropriate upper and lower labels are introduced together with a charge of the plastic material from which the record is to be stamped. After closing the plate 2, the mould 1 and 5 is heated by appropriate means, such as the circulation of hot water or steam through channels therein, and the plate 6 is urged upward by means of a hydraulic ram, not shown, mounted on the base plate 9. After the record has been pressed, the mould 1 and 5 is cooled by circulating cold water through channels therein. The press is then opened and the record is removed therefrom. The record press thus described represents the essential part of a conventional record press.

The application of the present invention to such a press may be seen from FIGURE 2, which shows a cross section of the lower mould 5 of a record press employing the invention. It will be understood however that the upper mould 1 will be of similar construction. The mould comprsies a backing portion 13 and a face plate 14 with annular grooves 16 and 17 equipped with sealing rings situated just outside the inner and outer circumferences of the flat portion of the mounting face. A record matrix 15 is applied to the face of the face plate 14 and is held firmly by means of the outer clamping ring 22 and the inner clamping plate 23, which press the matrix against the outer and inner sealing rings 17 and 16 respectively. The mould may be heated or cooled as required by circulating steam or cold water respectively through the channels 22 formed between the face plate 14 and the backing plate 13.

The matrix 15 is thus mounted on the face plate 14 is an airtight manner and it is arranged, in accordance with the present invention, that any air trapped within the space between the matrix 15 and the face plate 14 is removed by pumping, particularly when the mould is heated during the pressing operation. For this purpose a small air duct 18 is drilled near the periphery of the mounting face of the face plate 14, and this duct leads into a passage 19 which enters from the side of the face plate 19. The duct 19 is connected via a pipe 20 and a valve 21 to a vacuum supply.

The valve 21 is coupled in the automatic timing mechanism of the press so that it is opened just prior to the application of heat and pressure to the press and the matrix 15 is caused to bed down onto the face plate 14 by means of the vacuum. Thus in addition to the removal of air pockets, which would otherwise distort the surface of the matrix 15 as they expand with the heat, the matrix, being held in contact with the whole of the face plate, becomes uniformly heated and cooled therewith. The matrix is also sealed to the mould so that foreign bodies are prevented from entering the space between the mould and the matrix.

It will be observed from FIGURE 2 that the air duct 18 is drilled in the annular depression provided for forming the guard rim at the outside edge of the record and this is a convenient point to choose. It will be understood that although only one passage 18 is shown, a plurality of similar ducts may be arranged around the front surface face plate and the passage 19 extended to connect with them.

What we claim is:
1. A gramophone record moulding press including:
   (a) a face plate, the front surface of which is so formed that a record pressing matrix can be mounted thereon in a determined position,
   (b) a record pressing matrix mounted on said face plate and in contact therewith, and
   (c) means for securing said matrix to said front surface, and wherein the improvement consists of
   (d) sealing means to form a substantially air tight seal between said matrix and said front surface adjacent the edges of said matric when said matrix is secured thereon,
   (e) at least one channel leading from a point on said front surface covered by said matrix when said matrix is mounted thereon, whereby air can be removed from the space between said front surface and said record pressing matrix mounted thereon, and
   (f) a vacuum producing means and control means for connecting said air channel with said vacuum producing means at a particular time during the operation of said press to mould a gramophone record.

2. A moulding press according to claim 1 in which said face plate is formed with a groove corresponding to the outer rim of a gramophone record and said air channel leads from said groove.

3. A moulding press according to claim 1 comprising a further channel for conveying a heating medium into proximity with said face plate to heat said record pressing matrix mounted thereon, and said control means being arranged to connect said air channel to said pump at least while the heating medium is being conveyed into proximity with said face plate.

4. A gramophone record moulding press including:
   (a) a face plate, the front surface of which is formed to receive a record pressing matrix,
   (b) a record pressing matrix mounted on said face plate with its under surface in substantially overall contact with said face plate,
   (c) means securing said matrix to said front surface,
   (d) sealing means forming a substantially air tight seal between said matrix and said front surface adjacent the edges of the matrix,
   (e) at least one air channel leading from a point on said front surface covered by said matrix, and
   (f) a vacuum pump for removing air from between said front surface and said record pressing matrix during operation of said press to mould a gramophone record.

5. A moulding press according to claim 4 in which said front surface and said matrix have mating grooves corresponding to the rim of the gramophone record, and said air channel leads to said groove in the front surface.

References Cited

UNITED STATES PATENTS

| 1,146,413 | 7/1915 | Edison | 264—107 |
| 2,631,859 | 3/1953 | Ellsworth | 18—5.3 |
| 3,042,974 | 7/1962 | Gerstenmaier et al. | 264—316 |
| 2,499,397 | 3/1950 | Lyon | 264—316 |

FOREIGN PATENTS

| 527,117 | 6/1931 | Germany. |
| 688,802 | 5/1930 | France. |
| 901,814 | 7/1962 | Great Britain. |

J. HOWARD FLINT, Jr., Primary Examiner

U.S. Cl. X.R.

264—107